US008244689B2

(12) United States Patent
Betz et al.

(10) Patent No.: US 8,244,689 B2
(45) Date of Patent: Aug. 14, 2012

(54) ATTRIBUTE ENTROPY AS A SIGNAL IN OBJECT NORMALIZATION

(75) Inventors: Jonathan T. Betz, Summit, NJ (US); Vivek Menezes, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 661 days.

(21) Appl. No.: 11/356,765

(22) Filed: Feb. 17, 2006

(65) Prior Publication Data

US 2007/0198597 A1   Aug. 23, 2007

(51) Int. Cl.
*G06F 7/00* (2006.01)
*G06F 17/00* (2006.01)
(52) U.S. Cl. .................................................. 707/692
(58) Field of Classification Search .................. 707/201
See application file for complete search history.

(56) References Cited

U.S. PATENT DOCUMENTS

| 5,010,478 | A | 4/1991 | Deran ........................... 364/200 |
| 5,133,075 | A | 7/1992 | Risch ........................... 395/800 |
| 5,347,653 | A | 9/1994 | Flynn et al. ................... 395/600 |
| 5,440,730 | A | 8/1995 | Elmasri et al. ................ 395/600 |
| 5,475,819 | A | 12/1995 | Miller et al. ............. 395/200.03 |
| 5,519,608 | A | 5/1996 | Kupiec ..................... 364/419.08 |
| 5,560,005 | A | 9/1996 | Hoover et al. |
| 5,574,898 | A | 11/1996 | Leblang et al. |
| 5,680,622 | A | 10/1997 | Even ............................. 395/709 |
| 5,694,590 | A | 12/1997 | Thuraisingham et al. .... 395/600 |
| 5,701,470 | A | 12/1997 | Joy et al. ....................... 395/614 |
| 5,717,911 | A | 2/1998 | Madrid et al. ................. 395/602 |
| 5,717,951 | A | 2/1998 | Yabumoto ..................... 395/831 |
| 5,778,378 | A | 7/1998 | Rubin .......................... 707/103 |
| 5,787,413 | A | 7/1998 | Kauffman et al. ................ 707/2 |
| 5,793,966 | A | 8/1998 | Amstein et al. .......... 395/200.33 |
| 5,802,299 | A | 9/1998 | Logan ....................... 395/200.48 |
| 5,815,415 | A | 9/1998 | Bentley .......................... 364/578 |
| 5,819,210 | A | 10/1998 | Maxwell, III et al. ............. 704/9 |
| 5,819,265 | A | 10/1998 | Ravin et al. ....................... 707/5 |
| 5,822,743 | A | 10/1998 | Gupta et al. ..................... 706/50 |
| 5,826,258 | A | 10/1998 | Gupta et al. ...................... 707/4 |
| 5,838,979 | A | 11/1998 | Hart et al. ...................... 395/707 |
| 5,909,689 | A | 6/1999 | Van Ryzin .................... 707/203 |
| 5,920,859 | A | 7/1999 | Li ..................................... 707/5 |
| 5,943,670 | A | 8/1999 | Prager .............................. 707/5 |
| 5,956,718 | A | 9/1999 | Prasad et al. .................... 707/10 |

(Continued)

FOREIGN PATENT DOCUMENTS

JP    5-174020 A    7/1993

(Continued)

OTHER PUBLICATIONS

Andritsos et al., "Information-Theoretic Tools for Mining Database Structure from Large Data Sets," ACM SIGMOD, 2004.*
Koeller et al., "Approximate Matching of Textual Domain Attributes for Information Source Integration," ACM, Jun. 2005.*
Chen et al., "A Scheme for Inference Problems Using Rough Sets and Entropy," Springer-Verlag Berline Heidelberg, 2005.*

(Continued)

*Primary Examiner* — Pierre Vital
*Assistant Examiner* — Rachel J Lee
(74) *Attorney, Agent, or Firm* — Morgan, Lewis & Bockius LLP

(57) ABSTRACT

A system and method determines whether two objects are duplicate objects. The system and method matches common facts of the two objects based on a match measure, combines the entropies of the matching common facts, and determines whether the two objects are duplicate objects based on the sum of entropies.

18 Claims, 8 Drawing Sheets

U.S. PATENT DOCUMENTS

| | | | | |
|---|---|---|---|---|
| 5,974,254 | A | 10/1999 | Hsu | 395/703 |
| 5,987,460 | A | 11/1999 | Niwa et al. | 707/5 |
| 6,018,741 | A | 1/2000 | Howland et al. | 707/102 |
| 6,044,366 | A | 3/2000 | Graffe | 707/2 |
| 6,052,693 | A | 4/2000 | Smith et al. | 707/104 |
| 6,078,918 | A | 6/2000 | Allen et al. | 707/6 |
| 6,112,203 | A | 8/2000 | Bharat et al. | 707/5 |
| 6,112,210 | A | 8/2000 | Nori et al. | 707/103 |
| 6,122,647 | A | 9/2000 | Horowitz et al. | 707/513 |
| 6,134,555 | A | 10/2000 | Chadha | 707/102 |
| 6,138,270 | A | 10/2000 | Hsu | 717/3 |
| 6,212,526 | B1 | 4/2001 | Chaudhuri et al. | 707/102 |
| 6,240,546 | B1 | 5/2001 | Lee et al. | 717/4 |
| 6,263,328 | B1 | 7/2001 | Coden et al. | 707/3 |
| 6,285,999 | B1 | 9/2001 | Page | 707/5 |
| 6,289,338 | B1 | 9/2001 | Stoffel et al. | 707/3 |
| 6,311,194 | B1 | 10/2001 | Sheth et al. | 707/505 |
| 6,327,574 | B1 | 12/2001 | Kramer et al. | 705/14 |
| 6,349,275 | B1 | 2/2002 | Schumacher et al. | 704/8 |
| 6,377,943 | B1 | 4/2002 | Jakobsson | 707/2 |
| 6,397,228 | B1 | 5/2002 | Lamburt et al. | 707/203 |
| 6,473,898 | B1 | 10/2002 | Waugh et al. | 717/168 |
| 6,502,102 | B1 | 12/2002 | Haswell et al. | 707/102 |
| 6,556,991 | B1 | 4/2003 | Borkovsky | 707/6 |
| 6,567,936 | B1 | 5/2003 | Yang et al. | 714/37 |
| 6,572,661 | B1 | 6/2003 | Stern | 715/501.1 |
| 6,584,464 | B1 | 6/2003 | Warthen | 707/4 |
| 6,606,625 | B1 | 8/2003 | Muslea | 707/6 |
| 6,606,659 | B1 | 8/2003 | Hegli et al. | 709/225 |
| 6,609,123 | B1 | 8/2003 | Cazemier et al. | 707/4 |
| 6,656,991 | B2 | 12/2003 | Staccione et al. | 524/430 |
| 6,665,659 | B1 | 12/2003 | Logan | 707/3 |
| 6,665,666 | B1 | 12/2003 | Brown et al. | 707/5 |
| 6,665,837 | B1 | 12/2003 | Dean et al. | 707/5 |
| 6,745,189 | B2 | 6/2004 | Schreiber | 707/10 |
| 6,754,873 | B1 | 6/2004 | Law | 715/501.1 |
| 6,799,176 | B1 | 9/2004 | Page | 707/5 |
| 6,804,667 | B1 | 10/2004 | Martin | 707/6 |
| 6,820,081 | B1 | 11/2004 | Kawai et al. | 707/7 |
| 6,820,093 | B2 | 11/2004 | de la Huerga | 707/104.1 |
| 6,823,495 | B1 | 11/2004 | Vedula et al. | 715/805 |
| 6,850,896 | B1 | 2/2005 | Kelman et al. | 705/10 |
| 6,886,005 | B2 | 4/2005 | Davis | 707/2 |
| 6,901,403 | B1 | 5/2005 | Bata | 707/101 |
| 6,957,213 | B1 | 10/2005 | Yuret | 707/4 |
| 6,963,880 | B1 | 11/2005 | Pingte et al. | 707/103 |
| 7,003,522 | B1 | 2/2006 | Reynar et al. | 707/10 |
| 7,003,719 | B1 | 2/2006 | Rosenoff et al. | 715/500.1 |
| 7,020,662 | B2 | 3/2006 | Boreham et al. | 707/104.1 |
| 7,051,023 | B2 | 5/2006 | Kapur et al. | 707/5 |
| 7,080,073 | B1 | 7/2006 | Jiang et al. | 707/7 |
| 7,080,085 | B1 | 7/2006 | Choy | 707/101 |
| 7,143,099 | B2 | 11/2006 | Lecheler-Moore | 707/101 |
| 7,146,536 | B2 | 12/2006 | Bingham, Jr. et al. | 714/26 |
| 7,162,499 | B2 | 1/2007 | Lees et al. | 707/203 |
| 7,194,380 | B2 | 3/2007 | Barrow et al. | 702/181 |
| 7,197,449 | B2 | 3/2007 | Hu et al. | 704/9 |
| 7,277,879 | B2 | 10/2007 | Varadarajan | 707/1 |
| 7,305,380 | B1 | 12/2007 | Hoelzle et al. | 707/3 |
| 7,363,312 | B2 | 4/2008 | Goldsack | 707/102 |
| 7,472,182 | B1 | 12/2008 | Young et al. | 709/224 |
| 7,483,829 | B2 | 1/2009 | Murakami et al. | 704/10 |
| 7,493,317 | B2 | 2/2009 | Geva | 707/3 |
| 7,610,382 | B1 | 10/2009 | Siegel | |
| 7,747,571 | B2 | 6/2010 | Boggs | 707/613 |
| 7,797,282 | B1 | 9/2010 | Kirshenbaum et al. | 707/651 |
| 2002/0038307 | A1 | 3/2002 | Obradovic et al. | 707/102 |
| 2002/0042707 | A1 | 4/2002 | Zhao et al. | 704/9 |
| 2002/0065845 | A1 | 5/2002 | Naito et al. | 707/500.1 |
| 2002/0073115 | A1 | 6/2002 | Davis | 707/500 |
| 2002/0083039 | A1 | 6/2002 | Ferrari et al. | 707/1 |
| 2002/0087567 | A1 | 7/2002 | Spiegler et al. | |
| 2002/0147738 | A1 | 10/2002 | Reader | 707/500 |
| 2002/0169770 | A1 | 11/2002 | Kim et al. | 707/5 |
| 2002/0178448 | A1 | 11/2002 | Te Kiefte et al. | 725/46 |
| 2002/0194172 | A1 | 12/2002 | Schreiber | 707/4 |
| 2003/0018652 | A1 | 1/2003 | Heckerman et al. | 707/104 |
| 2003/0058706 | A1 | 3/2003 | Okamoto et al. | 365/200 |
| 2003/0078902 | A1 | 4/2003 | Leong et al. | 706/59 |
| 2003/0120644 | A1 | 6/2003 | Shirota | 707/3 |
| 2003/0120675 | A1 | 6/2003 | Stauber et al. | 707/100 |
| 2003/0126102 | A1 | 7/2003 | Borthwick | 704/21 |
| 2003/0149567 | A1 | 8/2003 | Schmitz et al. | 704/270 |
| 2003/0154071 | A1 | 8/2003 | Shreve | |
| 2003/0177110 | A1 | 9/2003 | Okamoto et al. | 707/3 |
| 2003/0182310 | A1 | 9/2003 | Charnock et al. | 707/104.1 |
| 2003/0195877 | A1 | 10/2003 | Ford et al. | 707/3 |
| 2003/0196052 | A1 | 10/2003 | Bolik et al. | 711/162 |
| 2004/0003067 | A1 | 1/2004 | Ferrin | 709/223 |
| 2004/0024739 | A1 | 2/2004 | Copperman et al. | 707/1 |
| 2004/0064447 | A1 | 4/2004 | Simske | 707/5 |
| 2004/0088292 | A1 | 5/2004 | Dettinger et al. | 707/4 |
| 2004/0107125 | A1 | 6/2004 | Guheen et al. | |
| 2004/0122844 | A1 | 6/2004 | Malloy et al. | 707/102 |
| 2004/0123240 | A1 | 6/2004 | Gerstl et al. | 715/513 |
| 2004/0128624 | A1 | 7/2004 | Arellano et al. | 715/530 |
| 2004/0143600 | A1 | 7/2004 | Musgrove et al. | 707/104.1 |
| 2004/0153456 | A1 | 8/2004 | Charnock et al. | 707/10 |
| 2004/0167870 | A1 | 8/2004 | Wakefield et al. | 707/1 |
| 2004/0177015 | A1 | 9/2004 | Galai et al. | 705/35 |
| 2004/0199923 | A1 | 10/2004 | Russek | 719/310 |
| 2004/0240542 | A1 | 12/2004 | Yeredor et al. | 375/240.01 |
| 2004/0255237 | A1 | 12/2004 | Tong | 715/501.1 |
| 2004/0260979 | A1 | 12/2004 | Kumai | 714/37 |
| 2004/0267700 | A1 | 12/2004 | Dumais et al. | 707/2 |
| 2005/0076012 | A1 | 4/2005 | Manber | 707/3 |
| 2005/0086211 | A1 | 4/2005 | Mayer | 707/3 |
| 2005/0086222 | A1 | 4/2005 | Wang et al. | 707/5 |
| 2005/0097150 | A1 | 5/2005 | McKeon et al. | 707/202 |
| 2005/0125311 | A1 | 6/2005 | Chidiac et al. | 705/28 |
| 2005/0149576 | A1 | 7/2005 | Marmaros et al. | 707/200 |
| 2005/0149851 | A1 | 7/2005 | Mittal | 715/501.1 |
| 2005/0187923 | A1 | 8/2005 | Cipollone | 707/3 |
| 2005/0240615 | A1 | 10/2005 | Barsness et al. | 707/102 |
| 2005/0256825 | A1 | 11/2005 | Dettinger et al. | 707/1 |
| 2006/0026122 | A1 | 2/2006 | Hurwood et al. | 707/1 |
| 2006/0036504 | A1 | 2/2006 | Allocca et al. | 705/26 |
| 2006/0041597 | A1 | 2/2006 | Conrad et al. | 707/200 |
| 2006/0047838 | A1* | 3/2006 | Chauhan | 709/230 |
| 2006/0053171 | A1 | 3/2006 | Eldridge et al. | 707/203 |
| 2006/0053175 | A1 | 3/2006 | Gardner et al. | 707/203 |
| 2006/0074824 | A1 | 4/2006 | Li | 706/20 |
| 2006/0074910 | A1 | 4/2006 | Yun | 707/7 |
| 2006/0085465 | A1 | 4/2006 | Nori et al. | 707/101 |
| 2006/0136585 | A1 | 6/2006 | Mayfield | 709/224 |
| 2006/0143227 | A1 | 6/2006 | Helm et al. | 707/103 |
| 2006/0143603 | A1 | 6/2006 | Kalthoff et al. | 717/172 |
| 2006/0152755 | A1 | 7/2006 | Curtis | 358/1.15 |
| 2006/0167991 | A1 | 7/2006 | Heikes et al. | 709/204 |
| 2006/0238919 | A1 | 10/2006 | Bradley | 360/128 |
| 2006/0248045 | A1 | 11/2006 | Toledano et al. | 707/2 |
| 2006/0248456 | A1 | 11/2006 | Bender et al. | 715/531 |
| 2006/0253418 | A1 | 11/2006 | Charnock et al. | 707/1 |
| 2006/0288268 | A1 | 12/2006 | Srinivasan et al. | 715/505 |
| 2006/0293879 | A1 | 12/2006 | Zhao et al. | 704/9 |
| 2007/0005593 | A1 | 1/2007 | Self et al. | 706/6 |
| 2007/0005639 | A1 | 1/2007 | Gaussier et al. | 707/103 |
| 2007/0016890 | A1 | 1/2007 | Brunner et al. | 717/107 |
| 2007/0038610 | A1 | 2/2007 | Omoigui | 707/3 |
| 2007/0073768 | A1 | 3/2007 | Goradia | 707/104.1 |
| 2007/0094246 | A1 | 4/2007 | Dill et al. | 707/4 |
| 2007/0130123 | A1 | 6/2007 | Majumder | 707/3 |
| 2007/0143317 | A1 | 6/2007 | Hogue et al. | 707/100 |
| 2007/0150800 | A1 | 6/2007 | Betz et al. | 715/500 |
| 2007/0198480 | A1 | 8/2007 | Hogue et al. | |
| 2007/0198481 | A1 | 8/2007 | Hogue et al. | 707/3 |
| 2007/0203867 | A1 | 8/2007 | Hogue et al. | 706/48 |
| 2007/0240031 | A1 | 10/2007 | Zhao | |
| 2007/0271268 | A1 | 11/2007 | Fontoura et al. | 707/6 |
| 2008/0071739 | A1 | 3/2008 | Kumar et al. | 707/3 |
| 2008/0127211 | A1 | 5/2008 | Belsey et al. | 719/315 |
| 2009/0006359 | A1 | 1/2009 | Liao | 707/5 |

FOREIGN PATENT DOCUMENTS

| | | |
|---|---|---|
| WO | WO 01/27713 A2 | 4/2001 |
| WO | WO 2004/114163 | 12/2004 |
| WO | WO 2006/104951 | 10/2006 |

OTHER PUBLICATIONS

Dey et al., "A Distance-Based Approach to Entity Reconciliation in Heterogeneous Databases," IEEE Transactions on Knowledge and Data Engineering, May/Jun. 2002.*
Cheng et al., "Entropy-based Subspace Clustering for Mining Numerical Data," ACM, 1999.*
Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering" 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.
Freitag, D. et al., "Boosted Wrapper Induction," American Association for Artificial Intelligence, 2000, 7 pages.
Guha, R. et al., "Disambiguating People in Search," WWW2004, ACM, May 17-22, 2004, 9 pages.
Guha, R., "Object Co-Identification on the Semantic Web," WWW2004, ACM, May 17-22, 2004, 9 pages.
Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.
"Information Entropy—Wikipedia, the free encyclopedia," [online] [Retrieved on May 3, 2006] Retrieved from the Internet<URL:http://en.wikipedia.org/wiki/Information_entropy>.
"Information Theory—Wikipedia, the free encyclopedia," [online] [Retrieved on May 3, 2006] Retrieved from the Internet<URL:http://en.wikipedia.org/wiki/Information_theory>.
Jones, R. et al., "Bootstrapping for Text Learning Tasks," 12 pages.
Kosseim, L, et al., "Answer Formulation for Question-Answering," 11 pages.
Liu, B. et al., "Mining Data Records in Web Pages," Conference '00, ACM, 2000, pp. 1-10.
McCallum, A. et al., "Object Consolodation by Graph Partitioning with a Conditionally-Trained Distance Metric," SIGKOD '03, ACM, Aug. 24-27, 2003, 6 pages.
Mihalcea, R. et al., "PageRank on Semantic Networks, with Application to Word Sense Disambiguation," 7 pages.
Mihalcea, R. et al., "TextRank: Bringing Order into Texts," 8 pages.
PCT International Search Report and Written Opinion, PCT/US06/07639, Sep. 13, 2006, 6 pages.
Prager, J. et al., "IBM's PIQUANT in TREC2003," 10 pages.
Prager, J. et al., "Question Answering using Constraint Satisfaction: QA-by-Dossier-with-Constraints," 8 pages.
Ramakrishnan, G. et al., "Is Question Answering an Acquired Skill?", WWW2004, ACM, May 17, 2004, pp. 111-120.
Agichtein, E., et al., "Snowball Extracting Relations from Large Plain-Text Collections," Columbia Univ. Computer Science Dept. Technical Report CUCS-033-99, Dec. 1999, pp. 1-13.
Andritsos, P. et al., "Information-Theoretic Tools for Mining Database Structure from Large Data Sets," ACM SIGMOD, Jun. 13-18, 2004, 12 pages.
Brin, S., et al., "The Anatomy of a Large-Scale Hypertextual Web Search Engine," 7th Int'l World Wide Web Conference, Brisbane, Australia, Apr. 14-18, 1998, pp. 1-26.
Bunescu, R., et al., "Using Encyclopedia Knowledge for Named Entity Disambiguation," Department of Computer Sciences, University of Texas, retrieved from internet Dec. 28, 2006, 8 pages.
Chen, X. et al., "A Scheme for Inference Problems Using Rough Sets and Entropy," Springer-Verlag Berlin Heidelberg 2005, pp. 558-567.
Cover, T.M., et al., "Elements of Information Theory," Wiley-InterScience, New York, NY, 1991, pp. 12-23.
Craswell, N., et al., "Effective Site Finding using Link Anchor Information," SIGIR '01, Sep. 9-12, 2001, pp. 250-257.
Dong, X., et al., "Reference Reconciliation in Complex Information Spaces," SIGACM-SIGMOD, 2005, 12 pages.

Downey, D., et al., "Learning Text Patterns for Web Information Extraction and Assessment," American Association for Artificial Intelligence, 2002, 6 pages.
Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.
Gray, R.M., "Entropy and Information Theory," Springer-Verlag, New York, NY, 1990, pp. 17-46.
Haveliwala, T.H., "Topic-Sensitive PageRank," Proceeding of the 11th Int'l World Wide Web Conference, Honolulu, Hawaii, May 7-11, 2002, pp. 1-23.
Jeh, G., et al., "Scaling Personalized Web Search," Proceedings of the 12th Int'l World Wide Web Conference, Budapest, Hungary, May 20-24, 2003, pp. 1-24.
Ji, H., et al., "Re-Ranking Algorithms for Name Tagging," Workshop on Computationally Hard Problems and Joint Inference in Speech and Language Processing, Jun. 2006, 8 pages.
Koeller, A. et al., "Approximate Matching of Textual Domain Attributes for Information Source Integration," IQIS, Jun. 17, 2005, pp. 77-86.
Kolodner, J., "Indexing and Retrieval Strategies for Natural Language Fact Retrieval," ACM Trans. Database Syst. 8.3., Sep. 1983, 434-464.
Mann, G. et al., "Unsupervised Personal Name Disambiguation," Proceedings of the Seventy Conference on Natural Language Learning at HLT-NAACL, 2003, 8 pages.
Microsoft Computer Dictionary Defines "quantity" as a "number", http://proquest.safaribooksonline.com/0735614954, May 1, 2002, 3 pages.
Microsoft Computer Dictionary defines "value" as "a quantity", http://proquest.safaribooksonline com/0735614954/ch18, May 1, 2002, 1 page.
Page, L., et al., "The PageRank Citation Ranking: Bringing Order to the Web," Stanford Digital Libraries Working Paper, 1998, pp. 1-17.
Pawson, D., "Sorting and Grouping," www.dpawson.co.uk/xsl/sect2/N6280.html>, Feb. 7, 2004, pp. 1-19.
Richardson, M., et al., "Beyond Page Rank: Machine Learning for Static Ranking," International World Wide Web Conference Committee, May 23, 2006, 9 pages.
Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.
Rioloff, E., et al., "Learning Dictionaries for Information Extraction by Multi-Level Bootstrapping," American Association for Artificial Intelligence, 1999, 6 pages.
Shannon, C.E., et al., "A Mathematical Theory of Communication," The Bell System Technical Journal, vol. 27, July, Oct. 1948, pp. 1-55.
Sun Microsystems, "Attribute Names," http://java.sun.com/products/jndi/tutorial/basics/directory/attrnames.html>, Feb. 17, 2004, pp. 1-2.
Wang, Y., et al., "C4-2: Combining Link and Contents in Clustering Web Search to Improve Information Interpretation," The University of Tokyo, 2002, pp. 1-9.
Wirzenius, Lars, "C Preprocessor Trick for Implementing Similar Data Types," Jan. 17, 2000, pp. 1-9.
MacKay, *Probability, Entropy, and Inference*, Chapter 2 of Information Theory, Inference, and Learning Algorithms, Cambridge University Press 2003, Version 7.2, Mar. 28, 2005, pp. 22-33 and 138-140.
Merriam Webster Dictionary defines "normalize" as "to make conform to or reduce to a norm or standard", 1865, 2 pages.
Merriam Merriam Webster Dictionary defines "value" as "a numerical quantity that is assigned or is by calculation or measurement", 1300, 2 pages.
International Search Report and Written Opinion for PCT/US2006/019807 dated Dec. 18, 2006, 13 pgs.
International Search Report and Written Opinion for PCT/US07/61156 dated Feb. 11, 2008, 5 pgs.
Microsoft Computer Dictionary defines "normalize" as "adjust number within specific range", May 1, 2004, 4 pgs. http://proquest.safaribooksonline.com/0735614954.

* cited by examiner

Example Format of Facts in Repository (each fact is associated with an object ID)

Example Facts in Repository (each fact is associated with an object ID)

Example Object Reference Table

Example Format of Facts in
Repository (each fact is associated
with an object ID)

Example Objects

| Object ID \ Attribute | Name | Phone Number | Type | Date of Birth | Height | Gender |
|---|---|---|---|---|---|---|
| O1 | Joe Henry | (703) 123-4567 | Human | 05/18/1974 | 5'10" | Male |
| O2 | J.H. | (703) 123-4567 | | 05/18/1974 | 5'9.5" | |

*FIG. 4(a)*

| Object ID \ Attribute | Name | Phone Number | Type | Date of Birth | Height | Gender |
|---|---|---|---|---|---|---|
| O1 | Joe Henry | (703) 123-4567 | Human | 05/18/1974 | 5'10" | Male |
| O3 | John Henry | | Horse | 03/09/1976 | 5'4" | Male |

*FIG. 4(b)*

| Attribute | Name | Phone Number | Type | Date of Birth | Height | Gender |
|---|---|---|---|---|---|---|
| Entropy | 5.26 | 6.32 | 2.17 | 5.81 | 3.04 | 0.81 |

*FIG. 4(c)*

ATTRIBUTE ENTROPY AS A SIGNAL IN OBJECT NORMALIZATION

CROSS-REFERENCE TO RELATED PATENT APPLICATIONS

This application is related to the following U.S. applications all of which are incorporated by reference herein: U.S. patent application Ser. No. 11/357,748 filed on Feb. 17, 2006; U.S. patent application Ser. No. 11/342,290 filed on Jan. 27, 2006; U.S. patent application Ser. No. 11/342,293 filed on Jan. 27, 2006; U.S. patent application Ser. No. 11/356,679 filed on Feb. 17, 2006; U.S. patent application Ser. No. 11/356,837 filed on Feb. 17, 2006; U.S. patent application Ser. No. 11/356,851 filed on Feb. 17, 2006; U.S. patent application Ser. No. 11/356,842 filed on Feb. 17, 2006; U.S. patent application Ser. No. 11/356,728 filed on Feb. 17, 2006; U.S. patent application Ser. No. 11/341,069 filed on Jan. 27, 2006; U.S. patent application Ser. No. 11/356,838 filed on Feb. 17, 2006; U.S. patent application Ser. No. 11/341,907 filed on Jan. 27, 2006; and U.S. patent application Ser. No. 11/342,277 filed on Jan. 27, 2006.

TECHNICAL FIELD

The disclosed embodiments relate generally to fact databases. More particularly, the disclosed embodiments relate to determining whether two objects are duplicate objects.

BACKGROUND

Data is often organized as large collections of objects. When the objects are added over time, there are often problems with data duplication. For example, a collection may include multiple objects that represent the same entity. Objects are duplicate objects if they represent the same entity, even if the information about the entity contained in the objects is different. Duplicate objects increase storage cost, take longer time to process, and confuse the display of information to the user. Duplicate objects can also lead to inaccurate results, such as an inaccurate count of distinct objects.

Some applications determine whether two objects are duplicate objects by comparing the value of a specific fact, such as the Social Security Number (SSN), the International Standard Book Number (ISBN), or the Universal Product Code (UPC). This approach is effective when all objects contain one of such facts. The specific facts used for comparison are analogous to the primary keys of database tables in relational databases. But for objects built on incomplete information, some objects may not have any of these facts. Also, when values of such facts associated with either of the two objects are inaccurate, this approach treats the two objects as distinct objects even if other facts associated with the two objects indicate that they are duplicate objects. Thus, this approach only determines whether two objects are duplicate objects when both objects include accurate and complete information.

Some other applications identify whether two objects are duplicate objects by comparing all common facts of the two objects. The two objects are determined to be duplicate objects when the number of matching common facts exceeds a threshold. This approach is problematic because it does not always give accurate results. For example, the chance that two objects sharing the same gender being duplicates are much lower than that of two objects sharing the same date of birth. By treating all facts equally, this approach is both over-inclusive by identifying distinct objects sharing many facts with little indicating value, and under-inclusive by excluding duplicate objects sharing few facts with great indicating value.

For these reasons, what is needed is a method and system that determines whether two objects built from imperfect information are duplicate objects.

SUMMARY

One method for determining whether two objects are duplicate objects is as follows. Common facts of the two objects are identified. Common facts of the two objects are the facts with the same attribute that are associated with the two objects. Values of the common facts are compared to identify matching common facts. Two objects have a matching common fact if they have a fact with the same attribute and the same value. Entropy of the matching common facts are combined (e.g., added) and compared with an entropy threshold. Objects with a sum of entropies exceeding the entropy threshold are determined to be duplicate objects.

These features are not the only features of the invention. In view of the drawings, specification, and claims, many additional features and advantages will be apparent.

BRIEF DESCRIPTION OF THE DRAWINGS

FIGS. 4(a)-(c) illustrate examples of determining whether two objects are duplicate objects, in accordance with a preferred embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

System Architecture

Figure 1:
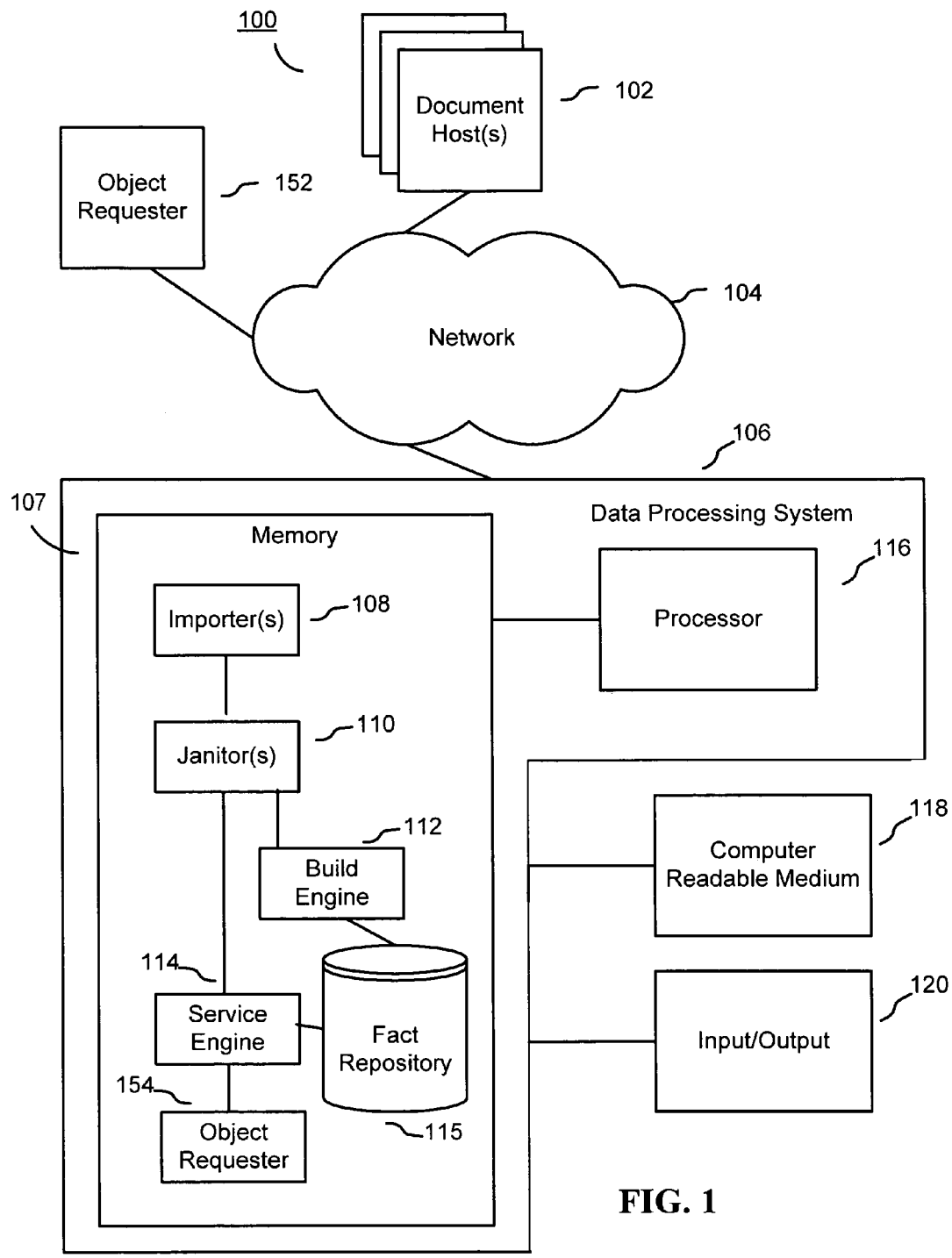
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(*a*)-2(*d*).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107, or alternatively one or more storage devices (e.g., one or more nonvolatile storage devices) within memory 107, includes a computer readable storage medium. Memory 107, or the computer readable storage medium of memory 514, includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable storage medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Data Structure

Figure 2A:
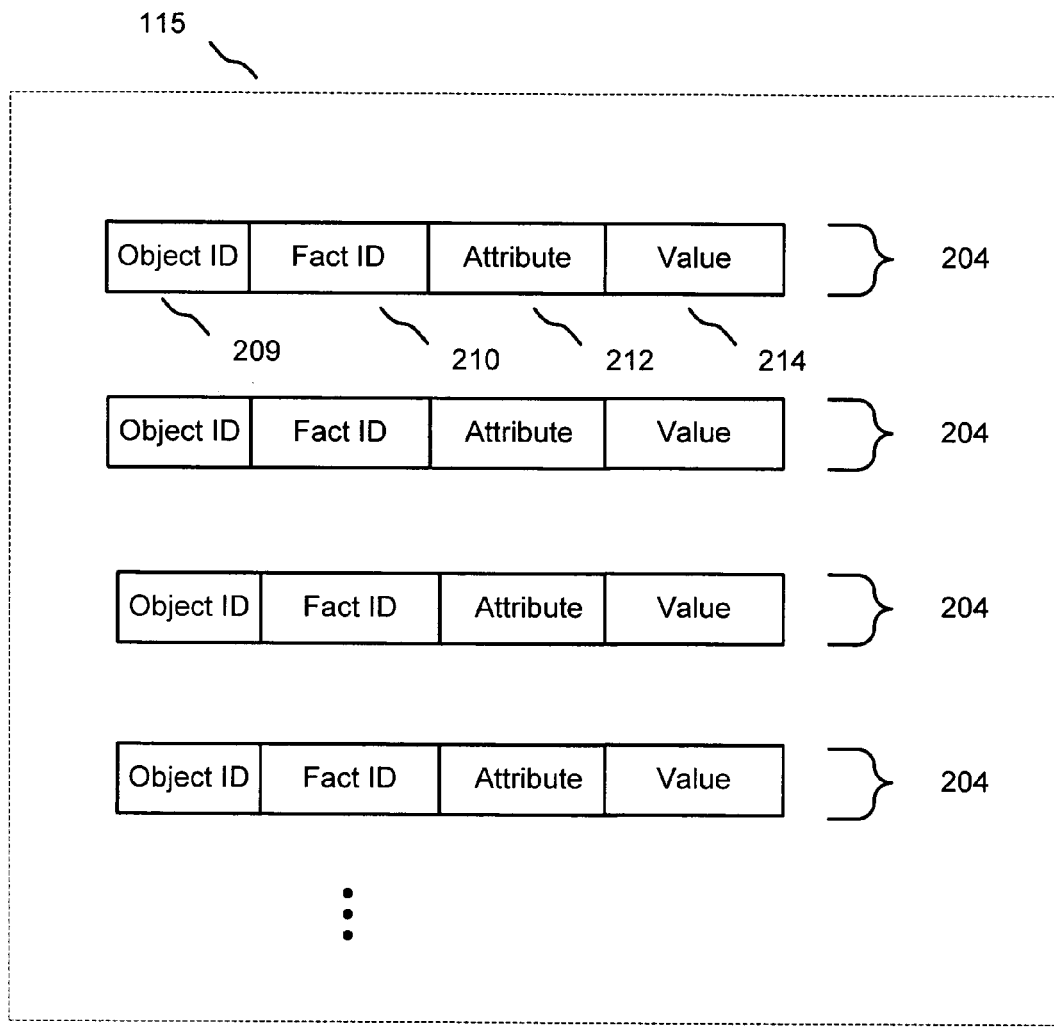
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
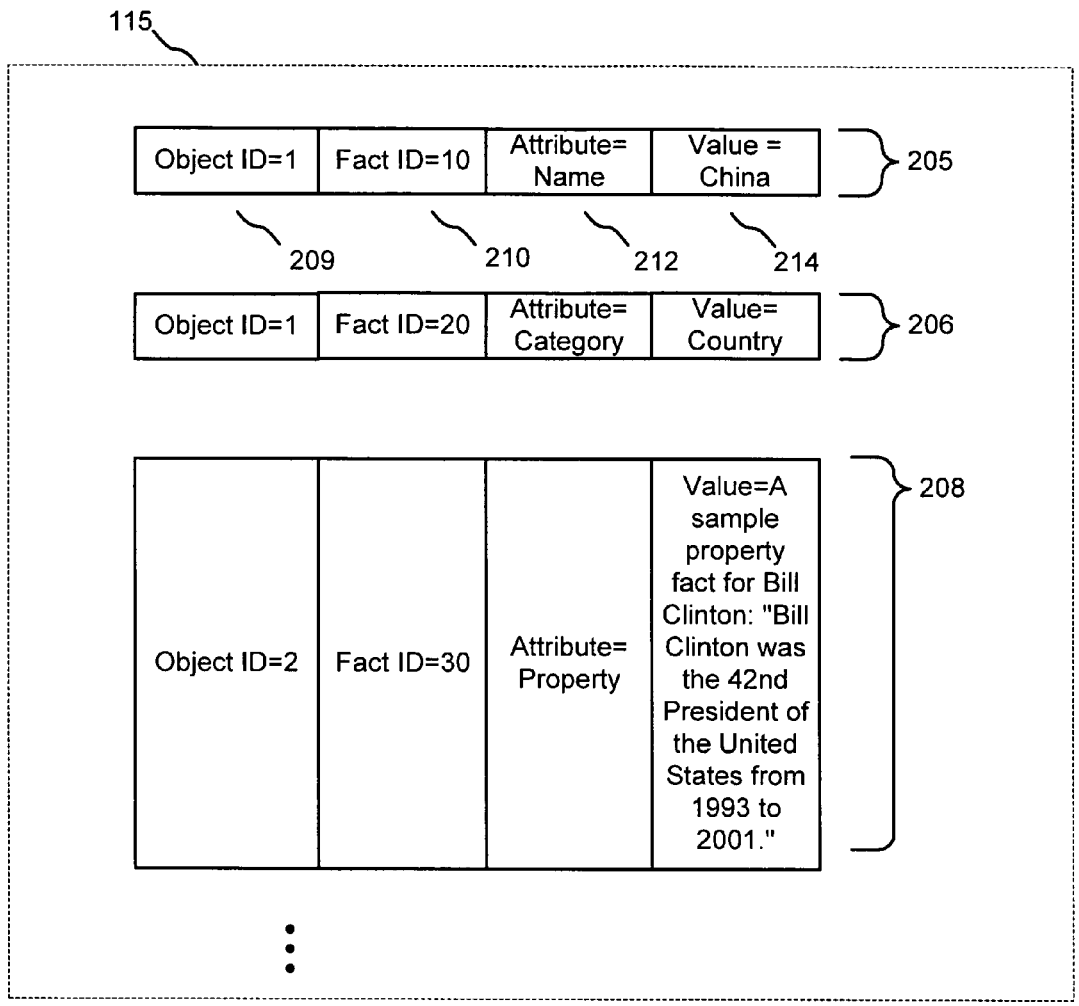

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
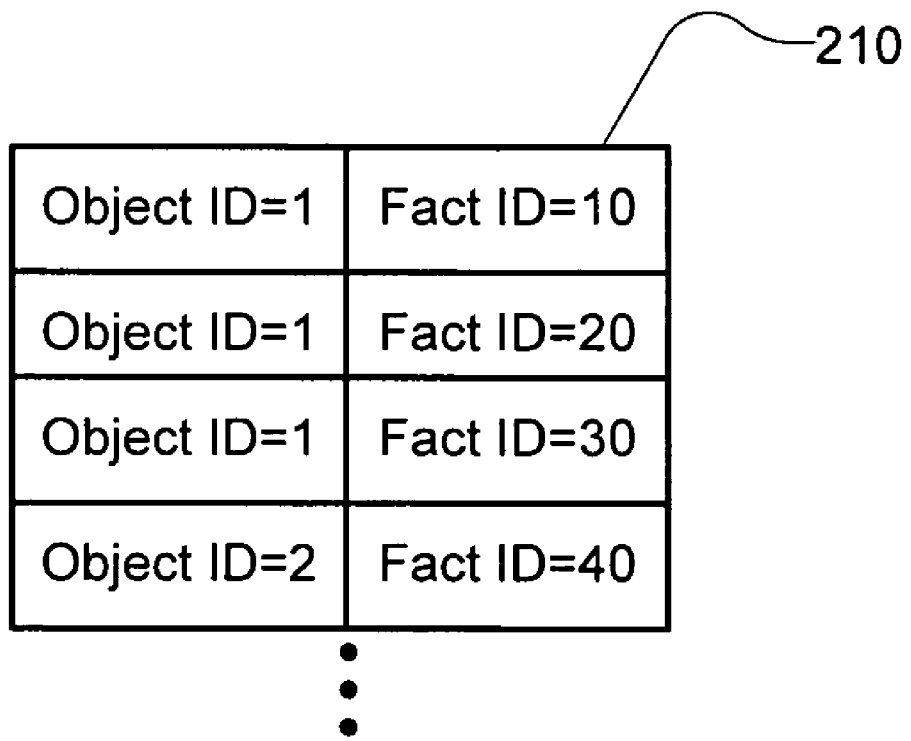

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
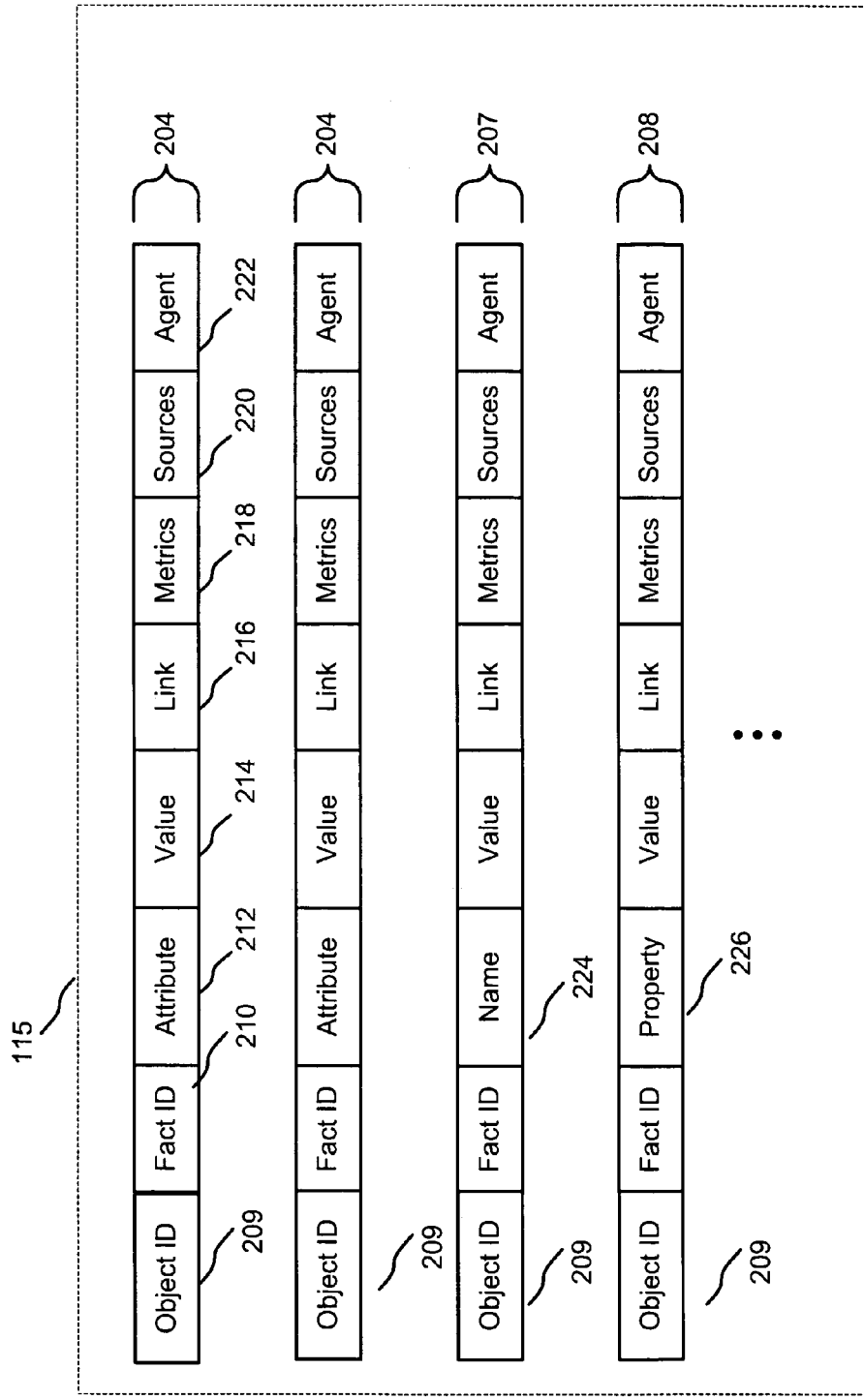
Figure 2E:
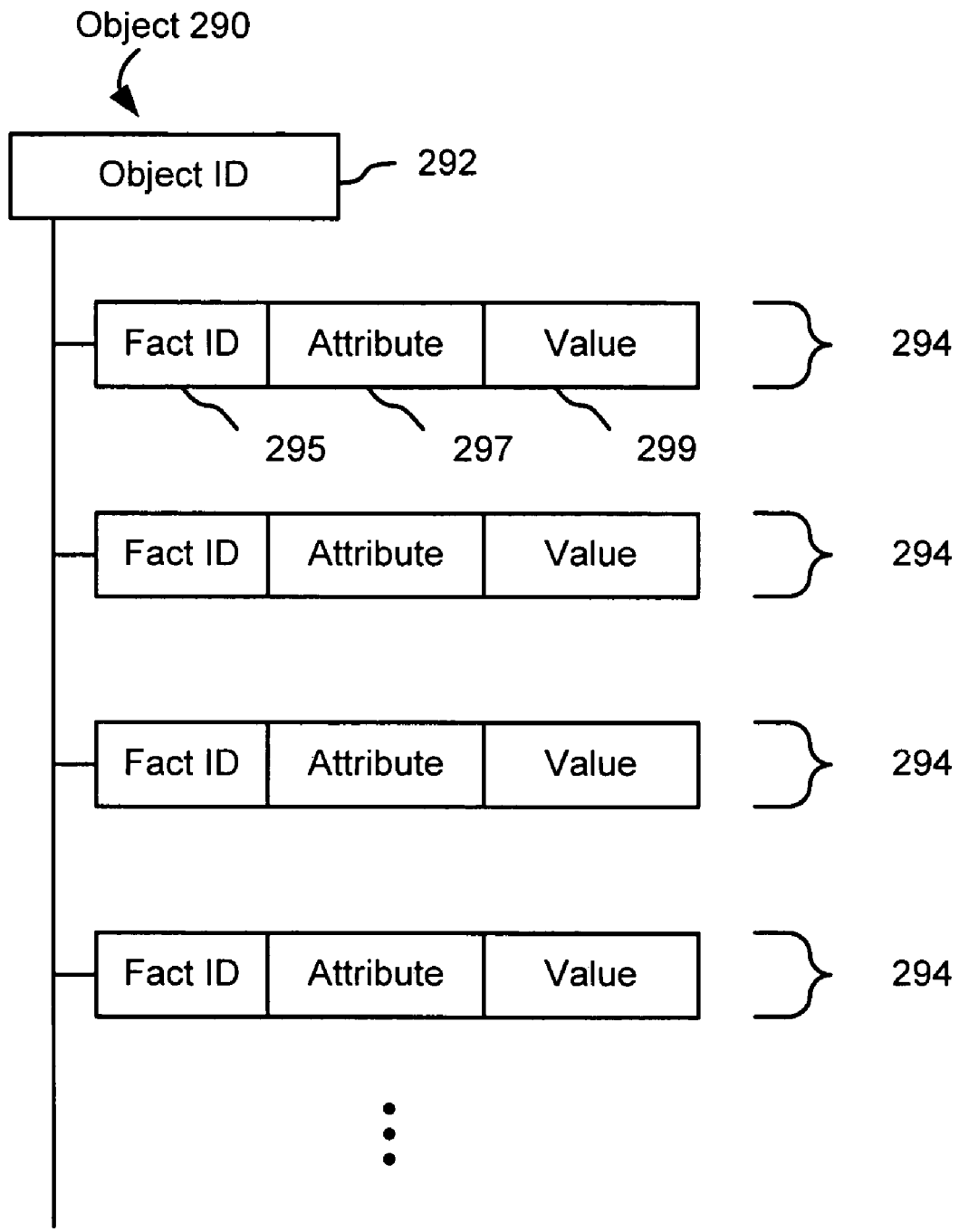
FIG. 2(e) is a block diagram illustrating an alternate data structure for facts and objects in accordance with preferred embodiments of the invention.

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(*a*)-2(*d*) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

FIG. 2(*e*) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Overview of Methodology

An entropy is a numerical measure of the amount of information carried by a variable; the more information the variable carries, the more random the variable, and the greater the entropy. Variables with a narrower range of possible values tend to have lower entropies. Variables whose values are not distributed evenly within the possible values tend to have lower entropies.

An attribute with low entropy will be one which has a low number of possible values or has many possible values but only a few them occur with any frequency. If an attribute has low entropy, the fact that two objects have the same value for that attribute provides little information about whether the two objects are the same entity. An attribute with a higher entropy is more informative than one with a lower entropy because the value of the attribute is more likely to distinguish an object. In other words, a high entropy means the associated attribute is highly useful for distinguishing among objects. As a result, attribute entropy (also called simply entropy) is a good indicator of the importance of matching common facts when determining whether two objects are duplicate objects.

For example, the chance that two objects of type human are identical if they share the same gender attribute is much less likely than if they share the same date of birth attribute. Also note that the entropy might be refined to be calculated based on the type of object—in other words, the weight attribute may not be useful for distinguishing among human objects but it may be useful for distinguishing among planet objects.

Claude E. Shannon defines entropy in terms of a discrete random event x, with possible states 1 . . . n as:

$$H(x) = \sum_{i=1}^{n} p(i) \log_2 \left( \frac{1}{p(i)} \right) = -\sum_{i=1}^{n} p(i) \log_2 p(i).$$

That is, the entropy of the event x is the sum, over all possible outcomes i of x, of the product of the probability of outcome i times the log of the probability of i.

In one embodiment, the janitor 110 uses entropy to identify duplicate objects so that the duplicate objects can be merged together.

Figure 3:
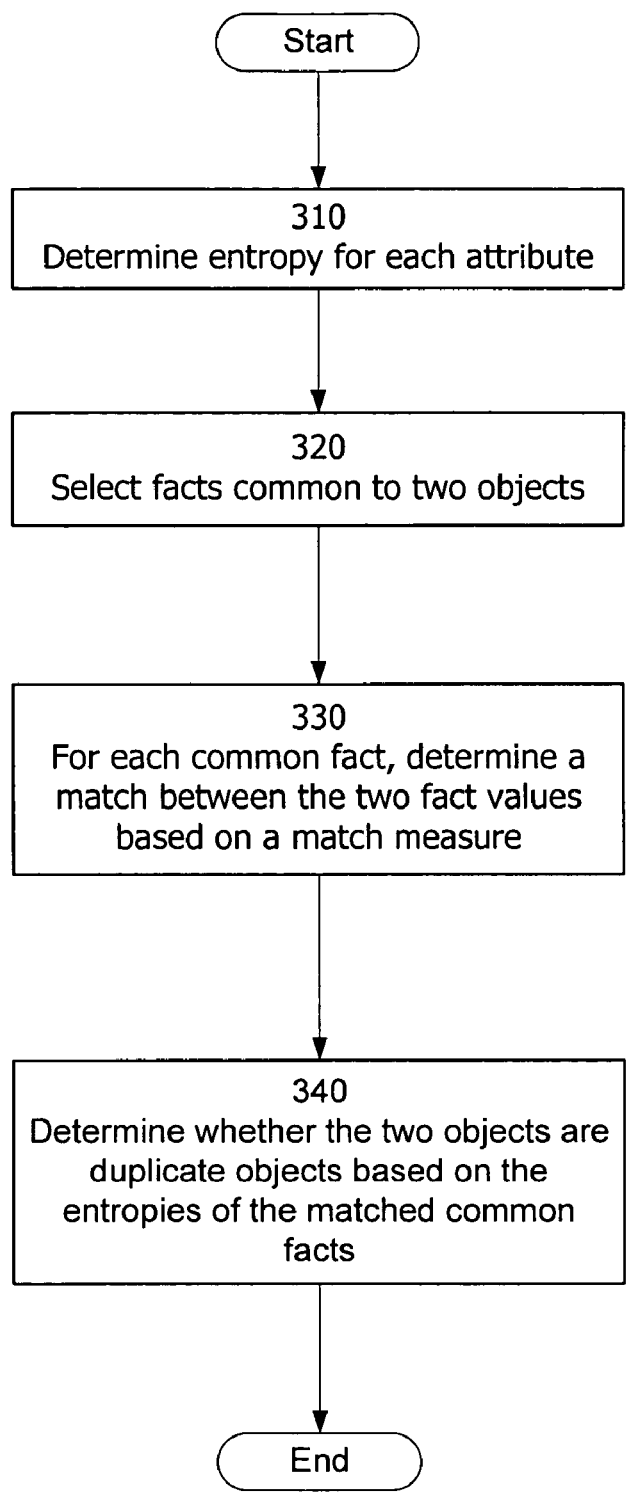
FIG. 3 is a flowchart of an exemplary method for determining whether two objects are duplicate objects, in accordance with a preferred embodiment of the invention.

Referring to FIG. 3, there is shown a flowchart of an exemplary method for determining whether two objects are duplicates according to one embodiment of the present invention. The method illustrated in FIG. 3 may be implemented in software, hardware, or a combination of hardware and software.

The flowchart shown in FIG. 3 will now be described in detail, illustrated by the example in FIGS. 4(*a*)-(*c*). The process commences with a set of objects, each having a set of facts including an attribute and a value (also called fact value). The set of objects are retrieved by the janitor 110 from the repository 115. In one embodiment, the janitor 110 retrieves the set of objects by asking the service engine 114 for the information stored in the repository 115. Depending how object information is stored in the repository 115, the janitor 110 needs to reconstruct the objects based on the facts and object information retrieved.

The janitor 110 determines 310 the entropy for each attribute, and saves the entropy in one of the metrics 218 of each fact with the attribute. In one embodiment, the janitor 110 asks the service engine 114 for all facts stored in the repository 115, and saves the attribute and value of each fact in a table. For each attribute, the janitor 110 calculates the associated entropy by applying the Shannon formula illustrated above to all values associated with the attribute in the table. For example, assuming there are four facts with attribute gender, three of them have value male, and one has value female, the entropy of the attribute gender will be: $H(gender)=p(male)\log_2(1/p(male))+p(female)\log_2(1/p(female))=75\%*\log_2(4/3)+25\%*\log_2 4 \approx 0.81$. The janitor 110 then stores the entropy 0.81 in one of the metrics 218 of each of the four facts with attribute gender. Alternatively, the entropy can be calculated using logarithm with bases other than two. In some embodiments, the janitor 110 recomputes the entropy for each attribute every time the repository 115 is modified.

Other embodiments may use other measures of entropy. In some embodiments, entropy is calculated based on the number of possible values that the associated attribute could hypothetically have, while in some other embodiments, entropy is calculated based on the number of actual fact values of the associated attribute. In some embodiments, certain attributes are not given an entropy. In some other embodiments, certain attributes are given a predetermined weight in stead of a calculated entropy.

For two of the set of objects, the janitor 110 selects 320 common facts of the two objects. Common facts are facts sharing the same attribute. Objects having matching fact values for common fact might be duplicates. An example of the two objects is shown in FIG. 4(a), another example is shown in FIG. 4(b).

As shown in FIG. 4(a), objects O1 and O2 are duplicate objects representing the same entity, a Mr. Joe M. Henry with nickname J. H. O1 is associated with six facts with the following attributes: name, phone number, type, date of birth, height, and gender. O2 is associated with four facts: name, phone number, date of birth, and height. Object O1 in FIG. 4(b) is the same object as the object O1 shown in FIG. 4(a). Object O3 in FIG. 4(b) represents a race horse named John Henry. O3 is associated with five facts: name, type, date of birth, height, and gender. Among the facts associated with the objects, there are considerable variations in the associated attributes and values. One example of the entropy of each attribute in FIGS. 4(a)-(b) is illustrated in FIG. 4(c).

The common facts of objects O1 and O2 as illustrated in FIG. 4(a) are the facts with the following attributes: name, phone number, date of birth, and height. The common facts of objects O1 and O3 in FIG. 4(b) are the facts with the following attributes: name, type, date of birth, height, and gender.

For each common fact associated with the two objects, the janitor 110 determines 330 a match of the fact value based on a match measure. The match measure is designed to distinguish fact values that can be treated as equivalent from fact values that are essentially different. In one example, the match measure requires the fact values to be identical in order to be a match. In another example, two fact values can be determined to match by the match measure when they are lexically equivalent, such as "U.S.A." and "United States." Alternatively, the match measure can be a fuzzy match based on string or tuple similarity measures (e.g., edit distance, Hamming Distance, Levenshtein Distance, Smith-Waterman Distance, Gotoh Distance, Jaro Distance Metric, Dice's Coefficient, Jaccard Coefficient to name a few).

One example of a fuzzy match measure is based on the edit distance between the fact values of the common fact. The edit distance is the minimum number of character insertion, deletion, or substitution needed to transform one fact value into the other. This approach is advantageous because typographical errors can be filtered out by the fuzzy match.

For example, values of a common fact are deemed to match when the edit distance between the two values is no more than a threshold value of 3. Fact with attribute name is a common fact of objects O1-O3 as illustrated in FIGS. 4(a)-(b). The value of fact with attribute name associated with objects O1 ("Joe Henry") and that of O3 ("John Henry") have an edit distance of two, thus the janitor 110 determines 330 values of common fact name of O1 and O3 to be matched. The value of fact with attribute name associated with object O1 ("Joe Henry") and that of O2 ("J. H.") have an edit distance of seven, and the janitor 110 determines 330 values of common fact name of O1 and O2 do not match.

In another example, the match measure treats numeric fact values within a range as matched. One such match measure deems two numeric fact values to match if the difference between either one of the two fact values and the arithmetic mean of the two fact values is no more than 1% of the arithmetic mean. Fact with attribute height is a common fact of objects O1-O3 as illustrated in FIGS. 4(a)-(b). The arithmetic mean of values of fact with attribute height associated with objects O1 and O2 is 5'9.75". Because the difference between the value of fact with attribute height associated with either objects and the mean equals 0.36% of the mean ((5'10"-5'9.75")/5'9.75"=(5'9.75"-5"9.5")/5'9.75"=0.25"/5'9.75"≈0.36%), less than the 1% threshold, the janitor 110 determines 330 values of common fact heights of O1 and O2 to be matched. On the other hand, the arithmetic mean of values of fact with attribute height associated with objects O1 and O3 is 5'7". Because the difference between the value of fact with attribute height associated with either objects and the mean equals 4.48% of the mean ((5'10"-5'7")/5'7"=(5'7"-5.4")/5'7"=3"/5'7"≈4.48%), more than the 1% threshold, the janitor 110 determines 330 values of common fact heights of O1 and O3 to be not matched. Instead of using arithmetic mean, the match measure can use other measures, such as geometric mean, harmonic mean, and the like.

The janitor 110 determines 340 whether the two objects are duplicate objects by combining the entropies of matching common facts into one sum of entropies and comparing the sum of entropies with an entropy threshold measure. The entropy threshold measure is designed to separate duplicate objects from distinct objects.

For example, one entropy threshold measure deems two objects as duplicate objects if the sum of entropies is over a threshold value of 7. Assuming the matching common facts of objects O1 and O2 are facts with attributes phone number, date of birth, and height, as illustrated in FIG. 4(a), the sum of entropies would be 6.32+5.81+3.04=15.17. See FIG. 4(c). Because 15.17 exceeds the entropy threshold value 7, the janitor 110 correctly determines 340 O1 and O2 to be duplicate objects. Assuming the matching common facts of objects O1 and O2 are facts with attributes name and gender, as illustrated in FIG. 4(b), the sum of entropies would be 5.26+0.81=6.07, smaller than the entropy threshold value 7. See FIG. 4(c). Consequently, the janitor 110 correctly determines 340 O1 and O3 to be distinct objects.

In other embodiments, the entropy threshold measure takes into consideration the entropies of common facts that do not match. The entropy threshold measure can deem two objects as duplicate objects if the sum of entropies of matching common facts exceeds the sum of entropies of common facts that do not match for a certain threshold value, for example, a threshold value of 5. Using the example illustrated above, the sum of matching entropies of objects O1 and O2 is 15.17, and the sum of entropies of common facts that do not match is 5.26, the entropy of attribute name, as shown in FIG. 4(c). Because the difference is 9.91, exceeding the threshold value of 5, the janitor 110 correctly determines 340 O1 and O2 to be duplicate objects. The sum of matching entropies of objects O1 and O3 is 6.07, and the sum of entropies of common facts that do not match is 11.02, the sum of entropies of attributes type, date of birth, and height, as shown in FIG. 4(*c*). Consequently, the janitor 110 correctly determines 340 O1 and O3 to be distinct objects.

To maintain the integrity of entropies, after the janitor 110 identifies duplicate objects, the entropies of common facts of the duplicate objects need to be recomputed. When re-computing the entropies, only one fact value of the common fact associated with the duplicate objects is used. In one embodiment, the janitor 110 has access to a copy of the table created when the janitor 110 determines 310 the entropy for each attribute. For each common fact of the duplicate objects, the janitor 110 removes the entry corresponding to the common fact associated with one of the two duplicate objects from the table, calculates a new entropy by applying the Shannon formula to all remaining values associated with the attribute of the common fact in the table, and updates the entropy stored in each fact of the attribute to the new entropy.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of determining if a first object and a second object represent a same entity, the method comprising:
    identifying one or more common attributes between the first object and the second object, wherein the first object and the second object are included in a fact repository located on one or more computer systems;
    determining an entropy for each of the one or more common attributes, wherein a respective entropy for a respective attribute in the one or more common attributes comprises a respective numeric value measuring a respective amount of information carried by the respective attribute;
    identifying a subset of the one or more common attributes whose respective values are equivalent;
    determining whether the first object and the second object represent the same entity by comparing a sum of entropies for the subset of the one or more common attributes to an entropy threshold measure; and
    in response to determining that the first object and the second object represent the same entity, merging the first object and the second object in the fact repository.

2. The method of claim 1 wherein identifying the subset of the one or more common attributes whose respective values are equivalent comprises comparing values of the attributes for the first object and the second object.

3. The method of claim 2, wherein comparing values comprises determining whether the values are the same.

4. The method of claim 2, wherein comparing values comprises calculating a match measure indicating that the values are equivalent.

5. The method of claim 1, wherein the respective numeric value comprises a sum, over all possible values associated with the respective attribute, of a product of a probability of each value and the log of the probability.

6. The method of claim 1, further comprising:
    responsive to the first object and the second object being determined to represent the same entity, calculating the entropy of a respective attribute in the one or more common attributes, values of facts for the first object or values of facts for the second object being excluded when doing the calculation.

7. The method of claim 2, wherein comparing values comprises determining whether the values are lexically equivalent.

8. The method of claim 4, wherein the match measure comprises a fuzzy match based on string or tuple similarity measures.

9. The method of claim 1, further comprising:
    identifying a first subset of the one or more common attributes whose respective values are equivalent;
    identifying a second subset of the one or more common attributes whose respective values are nonequivalent;
    determining whether the first object and the second object represent different entities by comparing a difference of a sum of entropies for the first subset of the one or more common attributes and a sum of entropies for the second subset of the one or more common attributes to an entropy threshold measure; and
    in response to determining that the first object and the second object do not represent different entities, merging the first object and the second object in the fact repository and deleting in the merged object the one or more common attributes and values corresponding to the one or more common attributes for one of the first object and the second object.

10. A computer-implemented method of determining if a first object and a second object represent different entities, the method comprising:
    identifying one or more common attributes between the first object and the second object, wherein the first object and the second object are included in a fact repository located on one or more computer systems;
    determining an entropy for each of the one or more common attributes;
    identifying a first subset of the one or more common attributes whose respective values are equivalent;
    identifying a second subset of the one or more common attributes whose respective values are nonequivalent;
    determining whether the first object and the second object represent different entities by comparing a difference of a sum of entropies for the first subset of the one or more common attributes and a sum of entropies for the second subset of the one or more common attributes to an entropy threshold measure; and
    in response to determining that the first object and the second object do not represent different entities, merging the first object and the second object in the fact repository and deleting in the merged object the one or more common attributes and values corresponding to the one or more common attributes for one of the first object.

11. The method of claim 10, wherein identifying the second subset of the one or more common attributes whose respective values are nonequivalent comprises calculating a match measure indicating that the values are nonequivalent.

12. The method of claim 10, wherein the respective entropy comprises a respective numeric value measuring a respective amount of information carried by the attribute.

13. The method of claim 10, wherein identifying the first subset of the one or more common attributes whose respective values are equivalent comprises determining whether the respective values of a respective attribute in the one or more common attributes are the same.

14. The method of claim 12, wherein the respective numeric value comprises a sum, over all possible values associated with the attribute, of a product of a probability of each value and the log of the probability.

15. A system for determining if a first object and a second object represent a same entity, the system comprising:
   a processor for executing programs; and
   a subsystem executable by the processor, the subsystem including:
      instructions for identifying one or more common attributes between the first object and the second object wherein the first object and the second object are included in a fact repository located on one or more computer systems;
      instructions for determining an entropy for each of the one or more common attributes, wherein a respective entropy for a respective attribute in the one or more common attributes comprises a respective numeric value measuring a respective amount of information carried by the respective attribute;
      instructions for identifying a subset of the one or more common attributes whose respective values are equivalent;
      instructions for determining whether the first object and the second object represent the same entity by comparing a sum of entropies for the subset of the one or more common attributes to an entropy threshold measure; and
      instructions for merging the first object and the second object in the fact repository in response to determining that the first object and the second object represent the same entity.

16. The system of claim 15, further comprising:
   instructions for identifying a first subset of the one or more common attributes whose respective values are equivalent;
   instructions for identifying a second subset of the one or more common attributes whose respective values are nonequivalent;
   instructions for determining whether the first object and the second object represent different entities by comparing a difference of a sum of entropies for the first subset of the one or more common attributes and a sum of entropies for the second subset of the one or more common attributes to an entropy threshold measure; and
   instructions for merging the first object and the second object in the fact repository and deleting in the merged object the one or more common attributes and values corresponding to the one or more common attributes for one of the first object and the second object in response to determining that the first object and the second object do not represent different entities.

17. A computer program product for use in conjunction with a computer system, the computer program product comprising a non-transitory computer readable storage medium and a computer program mechanism embedded therein, the computer program mechanism including:
   instructions for identifying one or more common attributes between the first object and the second object, wherein the first object and the second object are included in a fact repository located on one or more computer systems;
   instructions for determining an entropy for each of the one or more common attributes, wherein a respective entropy for a respective attribute in the one or more common attributes comprises a respective numeric value measuring a respective amount of information carried by the respective attribute;
   instructions for identifying a subset of the one or more common attributes whose respective values are equivalent;
   instructions for determining whether the first object and the second object represent a same entity by comparing a sum of entropies for the subset of the one or more common attributes to an entropy threshold measure; and
   instructions for merging the first object and the second object in the fact repository in response to determining that the first object and the second object represent the same entity.

18. The computer program product of claim 17, further comprising:
   instructions for identifying a first subset of the one or more common attributes whose respective values are equivalent;
   instructions for identifying a second subset of the one or more common attributes whose respective values are nonequivalent;
   instructions for determining whether the first object and the second object represent different entities by comparing a difference of a sum of entropies for the first subset of the one or more common attributes and a sum of entropies for the second subset of the one or more common attributes to an entropy threshold measure; and
   instructions for merging the first object and the second object in the fact repository and deleting in the merged object the one or more common attributes and values corresponding to the one or more common attributes for one of the first object and the second object one of the first object and the second object in response to determining that the first object and the second object do not represent different entities.

* * * * *

UNITED STATES PATENT AND TRADEMARK OFFICE
CERTIFICATE OF CORRECTION

| | | |
|---|---|---|
| PATENT NO. | : 8,244,689 B2 | Page 1 of 1 |
| APPLICATION NO. | : 11/356765 | |
| DATED | : August 14, 2012 | |
| INVENTOR(S) | : Betz et al. | |

It is certified that error appears in the above-identified patent and that said Letters Patent is hereby corrected as shown below:

In Column 12, line 53, please add -- and the second object -- after the first object;

In Column 14, lines 46-47, please delete "one of the first object and the second object".

Signed and Sealed this
Sixteenth Day of October, 2012

David J. Kappos
*Director of the United States Patent and Trademark Office*